(12) United States Patent
Aslam et al.

(10) Patent No.: US 8,661,784 B2
(45) Date of Patent: Mar. 4, 2014

(54) EXHAUST GAS AFTERTREATMENT

(75) Inventors: Toseef Aslam, Coulsdon (GB); Valérie Marie Renée Houel, Royston (GB); Raj Rao Rajaram, Slough (GB)

(73) Assignee: Johnson Matthey Public Limited Company, London (GB)

( * ) Notice: Subject to any disclaimer, the term of this patent is extended or adjusted under 35 U.S.C. 154(b) by 251 days.

(21) Appl. No.: 13/112,571

(22) Filed: May 20, 2011

(65) Prior Publication Data

US 2012/0117948 A1    May 17, 2012

(30) Foreign Application Priority Data

Nov. 11, 2010 (GB) .................................. 1019045.2

(51) Int. Cl.
*F01N 3/00* (2006.01)

(52) U.S. Cl.
USPC ................... 60/274; 60/286; 60/297; 60/299; 60/301

(58) Field of Classification Search
USPC ..................... 60/274, 286, 295, 297, 301, 299
See application file for complete search history.

(56) References Cited

U.S. PATENT DOCUMENTS

| | | | |
|---|---|---|---|
| 5,524,432 A | 6/1996 | Hansel | |
| 5,921,076 A | 7/1999 | Krutzsch et al. | |
| 7,334,400 B2 * | 2/2008 | Yan et al. | 60/286 |
| 8,356,474 B2 * | 1/2013 | Reuter et al. | 60/295 |
| 8,387,367 B2 * | 3/2013 | Houel et al. | 60/285 |
| 2007/0125072 A1 * | 6/2007 | McCarthy et al. | 60/286 |
| 2008/0053073 A1 | 3/2008 | Kalyanaraman et al. | |
| 2010/0000202 A1 | 1/2010 | Fisher et al. | |
| 2011/0011068 A1 * | 1/2011 | Ren et al. | 60/297 |

FOREIGN PATENT DOCUMENTS

| | | |
|---|---|---|
| WO | 2006048728 A1 | 5/2006 |
| WO | 2008012653 A2 | 1/2008 |
| WO | 2008067038 A1 | 6/2008 |

OTHER PUBLICATIONS

International Search Report for corresponding PCT Patent Application No. PCT/GB2011/052204 dated Feb. 2, 2012.
GB Search Report for corresponding Great Britain Patent Application No. GB1019045.2 dated Mar. 11, 2011.
Tsolakis et al., "Reaction Profiles during Exhaust-Assisted Reforming of Diesel Engine Fuels," *Energy & Fuels*, 2005, vol. 19, pp. 744-752.
Burch et al., "An Investigation of Promoter Effects in the Reduction of NO by $H_2$ Under Lean-Burn Conditions," *Journal of Catalysis*, 2002, vol. 208, pp. 435-447.
Richter et al., "The effect of hydrogen on the selective catalytic reduction of NO in excess oxygen over $Ag/Al_2O_3$," *Applied Catalysis B: Environmental*, 2004, vol. 51, pp. 261-274.

* cited by examiner

*Primary Examiner* — Binh Q Tran
(74) *Attorney, Agent, or Firm* — Kevin M. Carroll

(57) ABSTRACT

A method to improve $NO_x$ reduction in diesel engine exhausts by selective catalytic reduction using reductants comprising hydrocarbons, comprising passing the exhaust gases through a series of zones, said zones comprising a first zone in which a first catalyst is located that promotes HC SCR, to yield a first product gas; a second zone through which the first product gas is passed and in which a second catalyst is located that promotes the $H_2$-promoted HC SCR reaction to produce a second product gas and a third zone through which the second product gas is passed and in which a third catalyst is located that promotes $CO/H_2$ SCR to yield a final, $NO_x$-depleted, exhaust gas, and admixing a reformate gas comprising CO and $H_2$ with one or more of the exhaust gases, the first product gas and the second product gas. The use of the series of catalysts offers a sound alternative to urea-based SCR, without requiring a source and storage of urea.

8 Claims, No Drawings

EXHAUST GAS AFTERTREATMENT

CROSS-REFERENCE TO RELATED APPLICATIONS

This application claims priority of British Patent Application No. 1019045.2, filed Nov. 11, 2010, the disclosure of which is incorporated herein by reference in its entirety for all purposes.

BACKGROUND OF THE INVENTION

The present invention concerns an improved exhaust gas aftertreatment system, and more especially concerns an aftertreatment system for diesel (compression ignition) engines.

Diesel engines are now in widespread use in private cars and light commercial vehicles, as well as in more traditional applications such as buses and trucks, because of their lower fuel consumption than gasoline-fuelled vehicles. Diesel engines operate in a manner that results in an exhaust which still contains significant quantities of oxygen, as well as combustion products and by-products including $CO_2$, $H_2O$, $NO_x$ and particulates. There are also minor amounts of unburnt hydrocarbons (HC) and CO present in the exhaust.

Emission regulations for vehicles have been introduced in most countries to improve air quality, particularly in towns and cities. Of the emissions which are regulated, $NO_x$ is particularly difficult to treat in diesel exhausts, because of the difficulty in chemically reducing an exhaust gas component in the presence of excess oxygen. Some control of $NO_x$ can be achieved by engine design, although usually at the expense of an increase in other pollutants, or by NOx storage on a catalyst component and engine management to provide rich excursions to release stored NOx and to cause chemical reduction of the $NO_x$. State-of-the-art exhaust aftertreatment systems now include a Selective Catalytic Reduction (SCR) stage. SCR involves adding a reductant, usually urea which produces ammonia in use, to reduce $NO_x$ to $N_2$ whilst passing the gases over an SCR catalyst. Apart from the additional complexity of on-board storage and supply, and the associated infrastructure, many of the SCR catalysts have rather a narrow temperature window for operation. The on-board storage and supply and the infrastructure issues could possibly be avoided if another reductant, specifically diesel fuel itself, could be used. Such "HC SCR" has been proposed, and suggestions include using zeolites to store unburnt HC for release in an SCR catalyst operating window. Despite its many attractions, HC SCR has proved too difficult to operate in a real-life engine operating situation.

Reforming of hydrocarbons to form synthesis gas ($H_2$ and CO), possibly combined with the water gas shift reaction to increase the yield of $H_2$, is a well-known process practised on an industrial scale.

There have been some suggestions relating to the reforming of fuel, in relation to motor vehicles. Possibly the earliest proposals related to making $H_2$ for the fuelling of fuel cell vehicles. A complication with this is the need to avoid feeding significant quantities of CO into the fuel cell because the Pt catalysts used in the fuel cell are poisoned by CO. More recently, there have been proposals to reform fuel and/or exhaust gases for one or both of two purposes: (a) to recover heat and increase efficiency (with reduced fuel consumption etc) by converting fuel and exhaust components into higher calorific value fuel, with accompanying reduced engine-out emissions; (b) to generate $H_2$ and CO for use in catalytic aftertreatment of exhaust gases to reduce regulated emissions.

Exhaust gases from both major types of internal combustion engine (spark ignition, or gasoline fuelled, and compression ignition or diesel engines) contain high quantities of water vapour, but otherwise vary considerably. Gasoline engine exhausts are high temperature, of the order of 600-800° C., and contain relatively little oxygen. Diesel exhausts are low temperature (sometimes as low as 150° C. in light duty diesels operating under city conditions), and are relatively high in oxygen levels. Low temperatures with diesel exhausts provide challenges for catalysed aftertreatment devices, as the speed of all chemical reactions varies with temperature, and it proves difficult to "light off" the catalyst for all of the different reactions required. The "light off" temperature is considered to be that temperature at which 50% of the reaction takes place.

Unlike large-scale industrial reforming, where temperatures and other parameters such as throughput are controlled, the exhausts from vehicles can vary widely in volume and mass throughput, and in temperature. It has therefore proved very difficult to design and operate an effective diesel aftertreatment incorporating reforming of exhaust gases, although there have been some, essentially academic, proposals.

It is known to produce hydrogen, to improve subsequent aftertreatment emission control, within the engine cylinder itself, by fuel injection and combustion control.

Energy & Fuels 2005, 19, 744-752 discloses a system of exhaust-assisted reforming of diesel fuels. This paper is primarily concerned with recycling reformate to the inlet side of the engine. Although use of the reformate in aftertreatment is mentioned in the introduction, no details of how to achieve this effectively are given.

It is known that hydrogen is effective for the reduction of NO over a Pt-based catalyst at relatively low temperatures (which are representative of gasoline cold-start conditions): J Catalysis 208, 435-447 (2002). It is also known that the addition of hydrogen to a $NO/O_2$/propane mixture assists HC SCR over certain, but not all, silver-based catalysts: see Applied Catalysis B: Environmental 51 (2004) 261-274, U.S. Pat. No. 5,921,076 (Daimler-Benz AG) describes an exhaust system which utilises hydrogen and/or hydrocarbon additions to assist in the reduction of $NO_x$ in diesel engine exhausts. Although the possibility of one or more additional catalysts is mentioned, and it is contemplated that such catalyst(s) may store and release hydrocarbons, it is not believed that any embodiment within the scope of the present invention is disclosed or suggested.

SUMMARY OF THE INVENTION

There remains a need to improve the catalytic aftertreatment of exhausts from diesel engines, particularly to meet the increasingly challenging emission regulations being introduced, under realistic operating conditions.

The present invention provides a method to improve $NO_x$ reduction in diesel engine exhausts by selective catalytic reduction using reductants comprising hydrocarbons, comprising passing the exhaust gases through a series of zones, said zones comprising a first zone in which a first catalyst is located that promotes HC SCR, to yield a first product gas; a second zone through which the first product gas is passed and in which a second catalyst is located that promotes the $H_2$-promoted HC SCR reaction to produce a second product gas and a third zone through which the second product gas is passed and in which a third catalyst is located that promotes $CO/H_2$ SCR to yield a final, $NO_x$-depleted, exhaust gas, and admixing a reformate gas comprising CO and $H_2$ with one or more of the exhaust gases, the first product gas and the second product gas.

It has surprisingly been found that such a series of three catalytic zones is effective to deal with real-life operating conditions yet achieve good NOx reduction.

The present invention therefore also provides a catalyst system comprising a series of SCR catalysts including a first catalyst which promotes HC SCR, a second catalyst which promotes the $H_2$-promoted HC SCR reaction and a third catalyst which promotes $CO/H_2$ SCR.

DETAILED DESCRIPTION OF THE INVENTION

In the invention, a reformate gas formed by the reforming of engine exhaust gas supplemented by a fuel, most desirably supplemented by diesel fuel, is admixed with one or more of the exhaust gases and first and second product gases. In a first embodiment, the reformate gas is admixed with the exhaust gases before these enter the first zone. In a second embodiment, the reformate gas is admixed with the first and second product gases by feeding the reformate gas into said first and second product gas streams.

It is thought that feeding reformate gas with exhaust gas to the first zone could in some circumstances promote a parasitic reaction, namely the oxidation of HC with $O_2$. It is recommended that routine experimentation is carried out in individual cases to establish whether such parasitic reactions are a problem with the specific first catalyst and first zone conditions, and the final design is established after these tests. In the experiments described hereinafter, a reformate is admixed with the synthetic diesel exhaust gas before it enters the first zone.

The method of producing the reformate is not especially critical. Desirably, however, it is produced from diesel fuel in the type of apparatus disclosed in GB 1019027.0, filed Nov. 11, 2010. This disclosure admixes fuel with a small (under 10%, preferably about 1-2%) portion of the exhaust gases before passing it over a reforming catalyst.

The first zone is, in operation, a high temperature HC-NOx reduction zone. A catalyst such as a metal-zeolite, for example Cu/ZSM5, is suitable.

The second zone, receiving the gases exiting from the first zone, preferably admixed with the appropriate quantity of reformate gas to achieve an optimised $H_2$:HC ratio, acts to promote $H_2$—HC-NOx reduction; a suitable catalyst is based on $Ag/Al_2O_3$. Such a catalyst is normally susceptible to inhibition by HC, and to coking, but the presence of $H_2$ can minimise such problems.

The third zone conveniently contains a low temperature deNOx catalyst that utilizes $CO$—$H_2$ to promote NOx reduction. Such a catalyst is suitably a PGM catalyst which may include Pt or Pd. It may be advantageous to inject a relatively high quantity of reformate gas for high $NO_x$ conversion at this stage. Such a Pt or Pd catalyst may additionally act as a clean-up catalyst for any unconverted HC and CO.

The catalysts are conveniently coated in conventional manner on a single or separate flow-through substrates. Modern coating technologies permit accurate zoning deposits on metal or ceramic substrates.

An exhaust gas reformer may feed to the system of the invention or the output may be split between the system and a stream being fed to the inlet of the engine.

EXAMPLES

The invention will now be described by way of specific example, but should not be considered to be limited thereto.

A synthetic diesel exhaust gas containing 8% $O_2$, 5% $CO_2$, 5% $H_2O$ and 200 ppm NOx by vol was passed through a reformer, together with 0.07 ml/min of US06 diesel fuel, and the reformer was operated at 375° C. and an O/C ratio of 3.35. The reformer catalyst was a total of 2.6 $cm^3$ volume and was composed of Pt—Rh/$CeO_2$—$ZrO_2$/$Al_2O_3$. The output of the reformer contained approx 2% $H_2$. The reformate was mixed at a rate of 2 l/min with another flow of the synthetic exhaust gas, at 15 l/min, to yield a gas mixture having a composition of 8% $O_2$, 5% $CO_2$, 5% $H_2O$, 200 ppm $NO_x$, 1000 ppm $H_2$, 1500 ppm CO and 1000 ppm C1 HC. This gas mixture was passed into a catalytic system. No further HC was injected in front of the catalytic system.

The system used a first Cu/ZSM5 catalyst, a second $Ag/Al_2O_3$ catalyst and a third commercial Pd catalyst, deposited in equal lengths of a 1 in×3 in (2.25 cm×6.75 cm) cylindrical substrate. The NOx conversion was measured over a temperature range of 200-450° C., and ranged from 33% at 200° C. to a maximum of 66% at 300° C.

The system achieved useful $NO_x$ conversion over a wide temperature window.

A state-of-the-art conventional SCR system using $NH_3$ supplied as urea, is capable of achieving near 100% conversion of $NO_x$ between about 200 and 500° C., but requires on-board storage of urea.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method to improve $NO_x$ reduction in diesel engine exhausts by selective catalytic reduction using reductants comprising hydrocarbons, comprising passing the exhaust gases through a series of zones, said zones comprising a first zone in which a first catalyst is located that promotes HC SCR, to yield a first product gas; a second zone through which the first product gas is passed and in which a second catalyst is located that promotes the $H_2$-promoted HC SCR reaction to produce a second product gas and a third zone through which the second product gas is passed and in which a third catalyst is located that promotes $CO/H_2$ SCR to yield a final, $NO_x$-depleted, exhaust gas, and admixing a reformate gas comprising CO and $H_2$ with one or more of the exhaust gases, the first product gas and the second product gas.

2. A method according to claim 1, in which the first catalyst is a metal/zeolite catalyst.

3. A method according to claim 2, in which the first catalyst is a Cu/ZSM5 catalyst.

4. A method according to claim 1, in which the second catalyst is a $Ag/Al_2O_3$ catalyst.

5. A method according to claim 1, in which the third catalyst is a precious metal-based catalyst.

6. A method according to claim 5, in which the third catalyst is a Pd-based catalyst.

7. A method according to claim 1, wherein the reformate gas is admixed with the first product gas in an amount to achieve an optimised $H_2$:HC ratio for $H_2$-promoted SCR, before entering the second zone.

8. A method according to claim 1, further comprising mixing the reformate gas with the second product gas before entering the third zone.

* * * * *